_(12)_ United States Patent
Coxon et al.

(10) Patent No.: US 6,796,869 B1
(45) Date of Patent: Sep. 28, 2004

(54) CERAMIC ARC TUBE BY ANNEALING

(75) Inventors: George Eric Coxon, Liecestershire (GB); Charles D. Greskovich, Schenectady, NY (US); James Anthony Brewer, Scotia, NY (US); Curtis E. Scott, Mentor, OH (US)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 09/751,296

(22) Filed: Dec. 28, 2000

(51) Int. Cl.[7] .............. H01L 9/24; C21D 1/00; C04B 35/00; C04B 35/64
(52) U.S. Cl. .............. 445/26; 445/22; 445/27; 419/1; 419/29; 264/632
(58) Field of Search .............. 445/22, 26, 27; 419/1, 29; 264/632

(56) References Cited

U.S. PATENT DOCUMENTS

| | | | | |
|---|---|---|---|---|
| 3,873,657 A | * | 3/1975 | Toda et al. .............. | 264/648 |
| 3,917,782 A | * | 11/1975 | Holcombe et al. .............. | 264/632 |
| 4,174,973 A | * | 11/1979 | Rhodes et al. .............. | 501/119 |
| 4,323,545 A | * | 4/1982 | Sellers et al. .............. | 264/125 |
| 4,387,067 A | * | 6/1983 | Kobayashi et al. .............. | 264/636 |
| 4,427,785 A | * | 1/1984 | Prochazka et al. .............. | 501/128 |
| 4,761,390 A | * | 8/1988 | Hartnett et al. .............. | 264/633 |
| 4,968,459 A | * | 11/1990 | Sernetz .............. | 264/664 |
| 5,942,850 A | * | 8/1999 | Rutan et al. .............. | 313/571 |
| 5,955,845 A | * | 9/1999 | Fellows .............. | 313/596 |
| 6,126,887 A | | 10/2000 | Ward et al. .............. | 264/608 |
| 6,294,871 B1 | * | 9/2001 | Scott et al. .............. | 445/17 |
| 6,475,942 B1 | * | 11/2002 | Brewer et al. .............. | 501/153 |
| 6,592,695 B1 | | 7/2003 | Polis et al. .............. | 156/89.11 |

\* cited by examiner

*Primary Examiner*—Nimeshkumar D. Patel
*Assistant Examiner*—Mariceli Santiago
(74) *Attorney, Agent, or Firm*—Fay, Sharpe, Fagan, Minnich & McKee, LLP

(57) ABSTRACT

A process for making an arc tube comprises the steps of sintering an arc tube composition to form the arc tube; annealing the arc tube in a vacuum; and sealing the arc tube with at least one electrode. Preferably, the arc tube annealed according to the present process is a ceramic arc tube. The annealing of the arc tubes in a vacuum preferably occurs at a temperature of between about 1000° C. and 1500° C.

19 Claims, 1 Drawing Sheet

CERAMIC ARC TUBE BY ANNEALING

BACKGROUND OF THE INVENTION

1. Field of the Invention

The present invention is directed to a process of forming arc tubes. More particularly, the present invention is directed to lamps having ceramic arc tubes exhibiting an increased lumen efficiency of 3–10% over conventional lamps with sintered arc tubes and the process of forming same.

2. Discussion of the Art

There is a great need for conservation of electrical energy by producing efficient lamps for the lighting industry. Hundreds of millions of lamps are sold each year, and a 3–10% improvement in lamp efficiency would result in higher quality products with considerable savings in electrical energy. Typically, lamp efficiency is defined by the lumen output of a given wattage lamp or by the normalized value of lumens per watt (LPW).

Currently, ceramic metal halide (CMH) lamps with high quality, white light are commercially available. CMH lamps are generally constructed with a ceramic arc tube made from a polycrystalline, translucent aluminum oxide. The optical quality of the ceramic arc tube in a CMH lamp partly determines the lumen efficiency of the lamp. For example, CMH 70 W lamps made with conventional or "as-sintered" ceramic arc tubes typically exhibit relatively low LPW values of less than 85. Ceramic arc tubes employed in CMH 70 W lamps are initially prepared by sintering the ceramic arc tubes in a hydrogen furnace at temperatures near 1850° C.

Still another problem with CMH lamp manufacture is the variation in light output from lamp to lamp. That is, it is always desirable that lamp manufacture result in a repeatable, consistently performing lamp. Thus it is important to control the standard deviation of lamp so that quality control in the manufacturing process is improved.

It would be advantageous to develop an improved lamp and method for making the above lamps that would increase lamp efficiency and improve the standard deviation or uniformity of light output from lamp to lamp.

BRIEF SUMMARY OF THE INVENTION

In an exemplary embodiment of the present invention, a process for making an arc tube comprises the steps of sintering an arc tube composition to form the arc tube, and annealing the arc tube in a vacuum. Preferably, the arc tube annealed according to the present process is a ceramic arc tube. The annealing of the arc tubes in a vacuum preferably occurs at a temperature of between about 1000° C. and 1500° C.

In another exemplary embodiment, a process for making a ceramic metal halide lamp is provided. The process for making a ceramic metal halide lamp comprises the annealing process of the arc tube and additional steps to form the ceramic metal halide lamp.

DETAILED DESCRIPTION OF THE INVENTION

Figure 1:
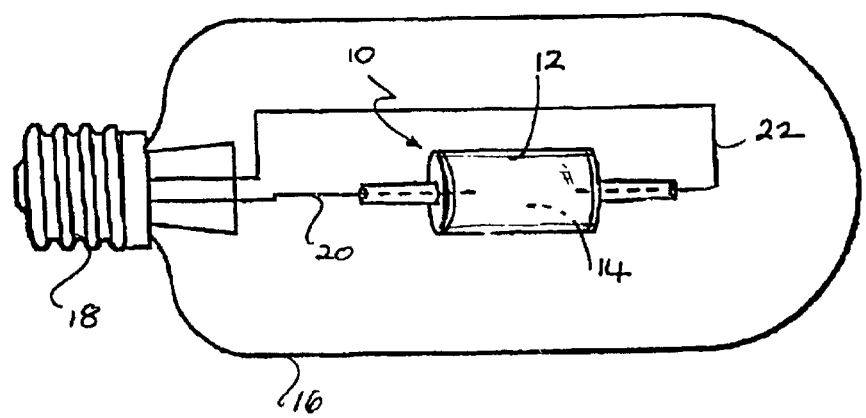
FIG. 1 shows a side view of a preferred high-pressure metal halide lamp formed from the present process.

With reference to FIG. 1, a high-pressure metal halide lamp is shown comprising a discharge vessel 10, including arc tube or body 12 which encloses a discharge chamber 14. The discharge chamber 14 contains a fill which includes at least one metal halide, such as sodium iodide, tantalum iodide or dysprosium iodide, in addition to mercury and a rare gas, such as argon or xenon. Other suitable fills, for initiating and sustaining an arc discharge, known in the art, are also contemplated. The discharge vessel 10 is enclosed in an outer envelope 16 having an electrical connector, such as a threaded shell or Edison base 18 at one end for providing power to the lamp in a manner well known in the art. First and second electrodes 20, 22 extend into the discharge chamber and are preferably formed from tungsten, molybdenum, and/or niobium, although other conventional materials can also be used.

Figure 2:
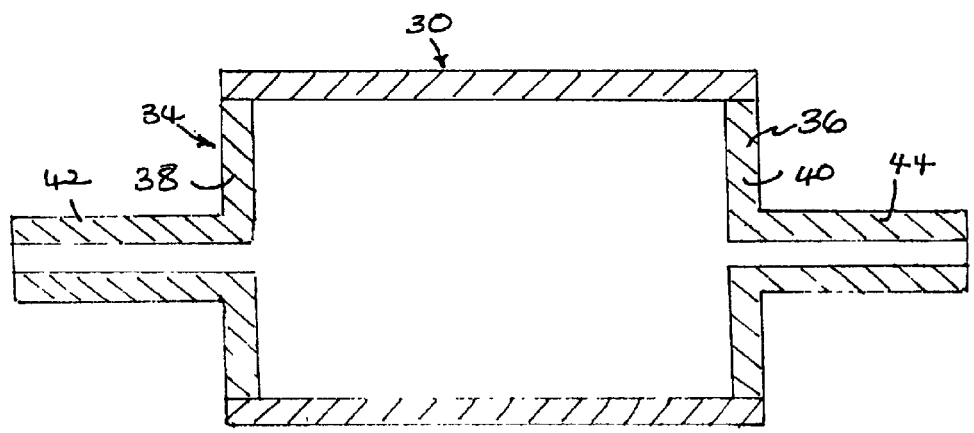
FIG. 2 shows a cross-sectional view of a preferred arc tube formed from the present process.

The ceramic arc tube shown in FIG. 2 includes a cylindrical portion or body 30 and end plugs or tubes 34, 36 extending axially from either end. The plugs 34, 36 each include an end wall portion 38, 40, with which a hollow leg portion or tube 42, 44, extends outwardly therefrom. The electrodes 20, 22 are received by the first and second leg portions 42, 44 and sealed into the leg portions to create a gas-tight discharge chamber 14.

The arc tube is preferably formed from a polycrystalline aluminum oxide ceramic, although other polycrystalline ceramic materials which are capable of withstanding high wall temperatures up to 1700–1900° C. and resistant to attack by the fill materials are also contemplated. The arc tube components are fabricated in any known manner, for example, by die pressing or extruding a mixture of ceramic powder and a binder. The binder is subsequently removed, for example, by solvent leaching with hexane, and/or by heating the arc tube to a temperature of about 200–400° C. Assembly of the arc tube involves partially sintering the assembled components at a temperature of around 1100° C. to form gas-tight joints. During this partial sintering, the components shrink differently due to different green densities of the parts and form bonded joints. Alternatively, the components may be partially sintered to a temperature of below about 1000° C. (bisque firing), prior to assembly of the components.

Alternatively, arc tubes may be formed by other processes such as machining green or bisque fired ceramics, slip casting, and sol-gel processing.

The partially sintered (or "green ceramic") arc tube preferably has an alumina content of about 99.99%, with magnesia (MgO) present at up to 0.5 weight percent, preferably at about 400–1500 ppm. The MgO imparts transparency to the finished tube during the final densification step.

The partially sintered arc tube may be fully densified by sintering to optical translucency at temperatures of 1850 to 1900° C. for 2–5 hours in moist hydrogen gas. Another method of densifying the arc tube to optical translucency is to use combined treatments of sintering plus hot isostatic pressing. The latter method first involves sintering the arc tube at temperatures of 1500 to 1600° C. for 2 to 10 hours in oxygen, hydrogen or vacuum until the sample attains closed porosity, which is typically achieved at 95 to 98% of its theoretical density (3.99 g/cc). Then the sintered sample is placed in a hot isostatic press and heated for 1 to 2 hours at temperatures of 1600 to 1900° C. under pressures of 5,000 to 30,000 p. s. i. of argon. The sintered ceramic is converted from an opaque material to a translucent polycrystalline aluminum oxide. The pressure eliminates substantially all microscopic porosity located on the grain boundaries of the sample. The sintering step also strengthens the joints between the components of the arc tube.

Finally, to form a high-transmittance arc tube, the sintered or hot isostatically pressed arc tube may be subjected to a chemical polishing treatment or a second high temperature sintering treatment which reduces the surface roughness of the arc tube.

For arc tube formulations, the densifiable powder is preferably a ceramic powder which becomes translucent during sintering, such as a sinterable alumina, yttria, yttrium-aluminum garnet (YAG) or mullite powder, which may be used alone or in combination with one or more sintering additives. For arc tube formulations, for example, a suitable sinterable alumina-based powder may contain a sintering additive in addition to alumina. One particularly useful sintering additive is MgO at concentrations up to about 0.15 wt. %. A sinterable mullite-based powder or YAG-based powder may or may not contain sintering additives. For example, a sinterable YAG-based powder may contain 200–500 PPM of $SiO_2$ as an additive. Generally, a sinterable ceramic powder contains sintering additive up to about 1% by weight of the powder.

For arc tube applications, the average size of the ceramic powder preferably ranges up to about 10 μm and depends largely on the particular densification technique employed, i.e., larger particle sizes can be used in densification processes involving sintering plus hot isostatic pressing whereas smaller particle sizes would be used in a single sintering treatment of a compact thereof. Preferably, however, the ceramic powder has an average particle size that is sub-micron and most preferably, it has an average particle size ranging from about 0.05 μm up to about 1 μm.

A further discussion regarding the formation of arc tubes is disclosed in U.S. Pat. No. 6,126,887 and U.S. Pat. No. 6,592,695, incorporated herein by reference.

The vacuum-annealing process for treating the translucent arc tubes may occur under various conditions. Preferably, the annealing process in a vacuum occurs at a temperature of 1500° C. or less, and more preferably between 1000° C. and 1500° C. The preferred pressure of the vacuum-annealing process for an arc tube is about $10^{-6}$ torr. In addition, the preferred time for the vacuum annealing is about 5 hours.

An additional step of dosing the arc tube may be utilized. Particularly, the arc tube may be dosed with compounds such as mercury and halides. Preferably, the arc tube is dosed with 5 to 6.5 mg of mercury and 10 to 15 mg of halide.

The arc tube formed from the present method may have various arc gap lengths. Generally, the arc gap length assists in setting the voltage of the lamp. Preferably, the arc gap length for the arc tube is between about 7.5 to 8 mm.

The lamps formed from the present method may operate in various orientations. Preferably, however, the lamp formed herein may operate in a generally vertical or horizontal orientation.

The lumen efficiency of 70 W and 150 W CMH lamps constructed with the preferred vacuum-annealed, Lucalox™ arc tubes is discovered to be 3–10% higher than lamps made with conventional, as-sintered arc tubes. In addition, uniformity of light output from lamp-to-lamp, i.e., the standard deviation, is significantly improved in such lamps if arc tubes are vacuum-annealed at temperatures between about 1000° and 1500° C.

The present invention is further illustrated by the following examples. It is to be understood that the present invention is not limited to the examples, and various changes and modifications may be made in the invention without departing from the spirit and scope thereof.

EXAMPLE 1

A group of 75 sintered arc tubes of the same size and shape for subsequently producing CMH 70 W-T lamps were randomly divided into 5 smaller groups of 15. The initial composition of the arc tubes was doped with 500 PPM (by weight) MgO as a sintering aid, and the samples were sintered in a hydrogen atmosphere at 1865° C. Each smaller group of arc tubes was annealed at 1200° C. in different atmospheres for optimum times of 5 hours in vacuum (~$10^{-6}$ torr), 10 hours in argon, nitrogen and hydrogen, and 3 hours in ambient air. Each annealed set of arc tubes was further processed identically to each other by dosing with 4.1 mg mercury and 11.0 mg of mixed halide salts of sodium, thallium, lanthanum, holmium and thulium, sealing with standard CMH electrodes made of tungsten/molybdenum/niobium, and finishing into single-ended lamps with fused silica jackets. All lamps were operated in the vertical orientation and measured for lumen output after burning for 3 and 100 hours.

Table 1 shows the mean value of lumen output from each group of lamps and the respective standard deviation given in brackets. Lamps, constructed with vacuum-annealed arc tubes produced the highest lumen outputs of 6200–6300 and the highest lumen efficiency of nearly 87 LPW. Lamps with argon- or nitrogen-annealed arc tubes produced about 6000 lumens with lower efficiencies of about 85 LPW. Lamps with hydrogen- or air-annealed arc tubes produced only about 5800–5900 lumens and low lumen efficiencies of about 83 LPW.

TABLE 1

| Annealing Atmosphere | Lamp Lumens (Mean) | | LPW |
|---|---|---|---|
| | 3 hours | 100 hours | 100 hours |
| Vacuum | 6301[88] | 6223[77] | 86.9[0.8] |
| Nitrogen | 6018[124] | 6044[99] | 85.6[2.1] |
| Argon | 6036[159] | 6004[112] | 84.7[1.2] |
| Hydrogen | 5876[115] | 5957[93] | 83.2[0.5] |
| Air | 5761[71] | 5947[86] | 83.1[0.8] |

EXAMPLE 2

Example 2 utilizes the vacuum-annealing method set forth in Example 1 and shows that there is about a 6% increase in lamp lumens by using arc tubes that were vacuum-annealed at 1200° C. instead of at 900° C. (compare 6390 lumens from lamps annealed at 1200° C. to 6009 lumens produced by lamps annealed at 900° C.). Again, all arc tubes were from the same initial as-sintered batch before making the annealing tests. Table 2 shows the lumen output from single-ended, 70 W CMH lamps by changing the vacuum annealing temperature of the arc tubes. Lumens were measured after 3 hours of burning time.

TABLE 2

| Annealing Conditions | Lamp Lumens (Mean) |
|---|---|
| As-sintered | 6095[106] |
| Air - 900° C. | 5841[159] |
| Vacuum - 900° C. | 6009[256] |
| Vacuum - 1200° C. | 6390[97] |

Thus, significant increases in produced lumens were realized by using a vacuum, as opposed to air, and annealing at a temperature of about 1200° C.

EXAMPLE 3

Twenty arc tubes of the identical geometry were split into two groups of ten. One group was vacuum-annealed at 1100° C. and the other group was vacuum-annealed at 1500° C. The arc tubes were identically sealed and finished into CMH 70W-T lamps. The resulting lamps were measured for lumen efficiency, and the values are listed in Table 3. CMH lamps made with arc tubes vacuum-annealed at 1500° C. exhibited about a 4% increase in both average lumens and lumen efficiency (LPW) compared to lamps made relative to arc tubes vacuum-annealed at the lower temperature of 1100° C. In addition, the standard deviations for both lumens and LPW were lower for the lamps made with arc tubes annealed at 1500° C., indicating greater uniformity of these lamp properties.

TABLE 3

| Vacuum-Anneal Temp., ° C. | Lumen Output After 3 Hours, (Mean) | LPW |
|---|---|---|
| 1100 | 5702[242] | 83.9[2.8] |
| 1500 | 5923[90] | 87.3[1.8] |

EXAMPLE 4

Arc tubes from the same parent batch of as-sintered material were randomly selected into two equal groups. One group was vacuum-annealed at 1050° C. for 10 hours while the second group was vacuum-annealed at 1200° C. for the same 10 hour period. The arc tube sets were dosed with different amounts of mercury (here, 5.4 and 6.4 mg of Hg) and halides and were subsequently evaluated. Also, the effect of arc gap length was evaluated. Again, two different values for arc gap length were employed, namely 7.6 mm and 7.9 mm. CMH 70 W-TD (dual-ended) lamps formed from the arc tube sets were operated in the horizontal orientation. The effect of vacuum temperature, dose amounts, and arc gap length of arc tubes on lumen output from 70 W CMH-TD lamps are summarized in Table 4. Among other things being equal, the 70 W-TD lamps constructed with arc tubes previously annealed in vacuum at 1200° C. had lumen outputs of about 4% greater than corresponding lamps made with arc tubes vacuum-annealed at 1050° C. The enhanced lumen output from lamps made with arc tubes vacuum-annealed at 1200° C. was independent of dose weights of mercury between about 5 and 6.5 milligrams, weights of halide between about 10 and 15 milligrams and arc gap length between about 7.5 and 8 mm which helps set the voltage.

TABLE 4

| Vacuum-Anneal Temp., ° C. | Dose (mg) Hg | Dose (mg) Halides | Arc Gap (mm) | Mean Lumens (3 hours burn time) |
|---|---|---|---|---|
| 1050 | 6.4 | 11.0 | 7.6 | 6454 |
| 1200 | 6.4 | 11.0 | 7.6 | 6733 |
| 1050 | 5.4 | 14.4 | 7.9 | 6050 |
| 1200 | 5.4 | 14.4 | 7.9 | 6318 |

EXAMPLE 5

A parent batch of twenty-eight (28) as-sintered arc tubes were divided into two equal groups. These arc tubes had the same size and shape for use in making 150 W lamps of the CMH-T type. One group was vacuum-annealed at 1200° C. for 10 hours while the other group was evaluated in their "as-sintered" or non-annealed condition. The two groups of arc tubes were then identically dosed, sealed, and placed into 150 W CMH lamps. The lamps were operated in the vertical orientation and burned for 3 hours before measuring total lumens and lumens per watt The results, given in Table 5, show that CMH 150 W lamps made with vacuum-annealed arc tubes produced a mean value of 14,050 lumens and 100.8 LPW. These values were, respectively, approximately 3% and 5% higher than the reference lamps made with the as-sintered (i.e., non-vacuum treated) arc tubes.

TABLE 5

| Arc Tube Condition | Mean Lumen Output @ 3 Hours | LPW |
|---|---|---|
| As-sintered | 13,654[312] | 96.0 |
| Vacuum-annealed | 14,050[286] | 100.8 |

Accordingly, the five examples above illustrate the improved performance resulting from annealing in a vacuum as opposed to various atmospheres such as nitrogen, argon, hydrogen, and air. Likewise, annealing at a temperature ranging from 1000° C. to 1500° C. demonstrates significant improvement in lumen output and lumens per watt.

The invention has been described with reference to the preferred embodiment. Obviously, modifications and alterations will occur to others upon a reading and understanding of the preceding detailed description. It is intended that the invention be construed as including all such alterations and modifications insofar as they come within the scope of the appended claims or the equivalents thereof.

What is claimed is:

1. A process for a making an arc tube, comprising the steps of:

sintering an arc tube composition to form an arc tube; and annealing the arc tube in a vacuum, wherein said arc tube composition has an alumina content of about 99.99%, and wherein said alumina has a particle size up to about 10 $\mu$m.

2. The process according to claim 1 wherein the annealing step occurs at a temperature from about 1000° C. to 1500° C.

3. The process according to claim 2 wherein the annealing step occurs at about 1200° C.

4. The process according to claim 1 wherein the step of sintering an arc tube composition to form an arc tube includes forming a ceramic arc tube.

5. The process according to claim 1 further comprising the step of filling the arc tube.

6. The process according to claim 5 further comprising the step of filling the arc tube with mercury.

7. The process according to claim 6 further comprising the step of filling the arc tube with mercury having a weight between about 5.5 and 6.5 milligrams.

8. The process according to claim 5 further comprising the step of filling the arc tube with halide.

9. The process according to claim 8 further comprising the step of filling the arc tube with a halide having a weight between 10 and 15 milligrams.

10. The process of claim 1 wherein the arc tube has a gap length between about 7.5 and 8 mm.

11. A process for a making an arc tube, comprising the steps of:

sintering an arc tube composition to form an arc tube; and annealing the arc tube in a pressure of about $10^{-6}$ torr, wherein said arc tube composition has an alumina content of about 99.99%, and wherein said alumina has a particle size up to about 10 $\mu$m.

12. A process for making a ceramic metal halide lamp comprising the steps of:

sintering an arc tube composition having a particle size up to about 10 $\mu$m to form an arc tube;

annealing the arc tube at a temperature from about 1000° to about 1500° C. and in a pressure of about $10^{-6}$ torr; and sealing the arc tube.

13. The process according to claim 12 further comprising the step of filling the arc tube.

14. The process according to claim 13 further comprising the step of filling the arc tube with mercury.

15. The process according to claim 14 further comprising the step of filling the arc tube with mercury having a weight between about 5.5 and 6.5 milligrams.

16. The process according to claim 13 further comprising the step of filling the arc tube with a halide.

17. The process according to claim 16 further comprising the step of filling the arc tube with a halide having a weight between 10 and 15 milligrams.

18. The process according to claim 12 wherein annealing occurs at a temperature of about 1200° C.

19. The process according to claim 12 wherein the step of annealing includes annealing the arc tube in a vacuum.

* * * * *